April 2, 1963 J. SAYERS 3,084,269
TRANSMISSION DEVICES
Filed June 24, 1959 3 Sheets-Sheet 1

James Sayers. Inventor.
By                    Attorney.

April 2, 1963 J. SAYERS 3,084,269
TRANSMISSION DEVICES
Filed June 24, 1959 3 Sheets-Sheet 3

Fig. 4

James Sayers.
Inventor.
By
Attorney.

United States Patent Office 3,084,269
Patented Apr. 2, 1963

3,084,269
TRANSMISSION DEVICES
James Sayers, 25 Twatling Road, Barnt Green, England
Filed June 24, 1959, Ser. No. 822,607
Claims priority, application Great Britain July 3, 1958
8 Claims. (Cl. 310—102)

This invention relates to a transmission device of the kind comprising two homopolar electrical machines having respective stators formed as parts of a common stator structure and having respective relatively rotatable rotors forming the input and output elements of the device, the rotors being included in an electrical circuit interlinked with respective magnetic circuits of the two machines and containing electrical brush means operative between successive relatively rotatable portions of the machine through which said electrical circuit extends, means being provided for varying the flux in at least one of said magnetic circuits.

One object of the invention is to avoid the production of magnetic saturation of said portions of the rotors and stator structure, which would tend to be produced by any non-useful magnetic flux extending circumferentially of a toroidal zone bounded by said electrical current, and which would inhibit variations in the useful main working magnetic fluxes necessary to achieve satisfactory torque-speed conversion.

A further object is to provide rotors and a stator structure of high structural strength capable of withstanding the mechanical forces exerted on the laminations by virtue of the electrical current carried thereby and the magnetic flux traversing them during operation of the machine. A further object is to enable rotors and stator structure to be pre-formed as units of united laminations thus facilitating assembly of the device.

It will be understood that the laminated construction is based on a principle which is quite different from that involved in the use of laminated stators and rotors in electrical machines generally. In the latter case, the laminations are insulated electrically from each other by coatings of insulating material, and their purpose is only to convey an intentionally varying or high frequency magnetic flux which tends to produce losses by way of eddy currents and hysteresis, these losses being reduced by the laminated construction and the intervening barriers of electrical insulation.

In the present case however, the magnetic flux conveyed is substantially unvarying except by way of relatively long-term variations, that is to say, it is uni-directional and of only slowly changing value, and the purpose of laminations is primarily to provide a low reluctance magnetic path through the rotors and stator in the direction of the main working flux, and a high reluctance path circumferentially in the toroidal zone.

A further object of the invention is to avoid substantial high frequency magnetic flux variation in each lamination due to a salient pole effect and which would produce substantial eddy current and hysteresis loss.

Again this effect is quite distinct from that contained in a normal laminated electrical machine. Avoidance of any current and hysteresis loss is achieved by ensuring a more or less constant value of magnetic flux in each individual lamination, and this in turn is ensured by the spreading out, into a more or less uniform flux distribution, the flux extending across each of said gaps, so that the edges of the thin laminations which convey this flux are not presented to successively high and low flux densities in the gap as relative rotation takes place. It will be appreciated that minimisation of eddy current and hysteresis loss in conventional electrical machines is not achieved in this way, and would not be achieved at all in these machines were the barriers of insulating material omitted from between the laminations whereas in the present construction, the laminations are in electrical contact with each other and are preferably fused together.

Whilst it is to be understood that a transmission device in accordance with the invention is applicable generally to the transmission of power between a driving member (operatively connected with the rotary input member of the transmission device) and a driven member (operatively connected with the rotary output member of the transmission device) certain specific advantageous applications are contemplated. One of these is to the transmission of power between a prime mover and a driven member wherein the conditions of operation of the driven member impose thereon variations of load.

A particular example is the case of a land vehicle driven by a prime mover usually in the form of an internal combustion or other heat engine.

The invention will now be described by way of example with reference to the accompanying drawings wherein.

Figures 1, 2:
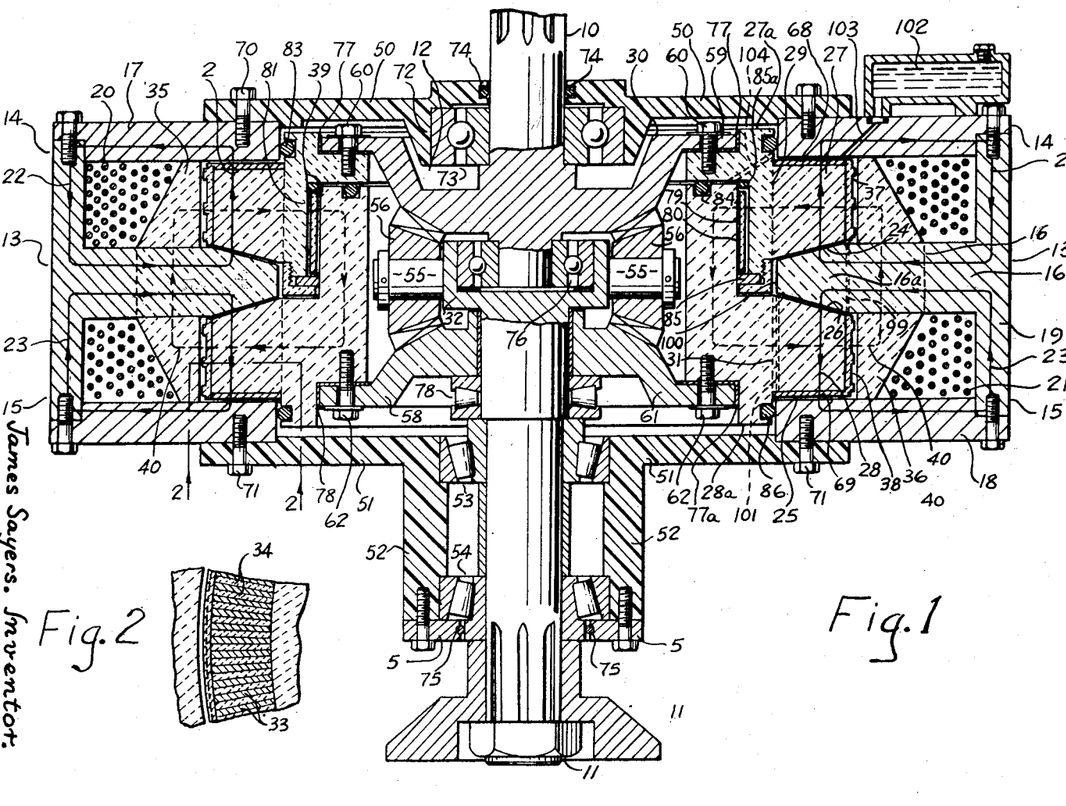
FIGURE 1 is a plan view in diametral cross section of one construction of transmission device in accordance with the invention.
FIGURE 2 is a fragmentary view in end elevation and in cross section on the line 2—2 of FIGURE 1.

The transmission device comprises a rotary input shaft 10 and a rotary output shaft 11 mounted for rotation coaxially with each other and operatively connected with each other in the particular construction illustrated through two couplings which are in effect in parallel with each other, such couplings being constituted by a differential gear indicated generally at 12 and a duplex homopolar electrical machine indicated generally at 13. The machine 13 comprises a homopolar input machine 14 (which normally acts as a generator) and a homopolar output machine 15 (which normally acts as a motor), these two machines having a magnetic field structure which includes a central annular pole piece 16 common to both machines, and outer annular pole pieces 17 and 18 forming parts of the machines 14 and 15 respectively all these pole pieces being connected magnetically at their outer ends by a cylindrical yoke 19 which may be integral with the outer portion of the common pole piece 16 if desired.

The machine 14 is provided with an excitation winding 20 accommodated in the outer part of the annular chamber afforded between the pole pieces 16 and 17 whilst a similar excitation winding 21 is accommodated in the like chamber between the pole pieces 16 and 18, these windings being connected each to a source of direct current.

In a typical manner of operation the direct excitation currents flowing through the windings 20 and 21 may set up a magnetic flux in the two magnetic circuits afforded by the field parts of the two machines as shown in full lines at 22 and 23 respectively.

Each of the magnetic circuits includes a gap in the one case bounded by pole faces 2 and 24 and in the other case bounded by pole faces 25 and 26 and in these two gaps are disposed outer parts 27 and 28 of two armatures, these being an input armature 29 connected through the intermediary of one gear element 30 of the differential to the input shaft, and the other being an output armature 31 connected through the intermediary of a second gear element 58 and a third element 32 of the differential gear to the output shaft 11.

The pole faces 2 and 25 lie in planes perpendicular to the laminar axis of the shafts 10, 11 while the pole faces 24 and 26 are of frustro-conical form by value of the width of the inner portion of the pole pieces 16 which reduces in an inward radial direction in conformity with the reduction in total flux which it is required to carry.

The armature parts 27 and 28 are each constructed to afford a magnetically conductive path between the pole faces forming the axial boundaries of their respective gaps and also to afford an electrically conductive path between the inner and outer circumferential boundaries of their respective gaps. The particular construction adopted in the example now described is illustrated more fully in FIGURE 2 and comprises laminations 33 of a suitable magnetically conductive material such as a low carbon steel and laminations 34 of a suitable electrically conductive material such as copper, which are interleaved with the laminations 33 so that preferably the laminations 33 occupy alternate positions with the laminations 34 intervening between them as will be apparent from FIGURE 2.

These laminations are disposed in radial planes passing through the axis of the shafts 10 and 11.

The laminations are preferably united with each other by fusion, e.g. welded, brazed or soldered together to form a rigid unit of high structural strength.

The inner portion 16a of the pole piece is similarly formed of like interleaved laminations united together by fusion.

The inner portions 27a and 28a of the armatures 29 and 31 may be formed wholly of electrically conductive material such as copper. This is indicated in FIGURE 1 by broken line hatching whereas the laminated parts 27, 28 are shown in shading consisting of alternate full and broken lines. Portions of the field structure (formed wholly of magnetically conductive material such as low carbon steel) are shaded wholly in full lines.

To reduce the generation of eddy currents in the surface layers of armature parts 27, 28 opposed to the pole faces 2 and 25, the armature parts at these positions are provided with iron face pieces, 68, 69. Similar face pieces are not provided on faces of the armature parts opposed to the pole faces 24 and 26 of the inner pole face since this would set up an undesirable magnetic short circuit interlocked with the main current path as hereinafter referred to.

In order to ensure that the magnetic flux distribution in the gaps between the pole faces 24 and 26 and the opposed faces of the armature parts is substantially uniform in the direction of the circumference of the gap, the laminations are made thin relatively to the thickness of the gap. Typically the ratio of the thickness of the laminations to the thickness of the gap may be about 2:1. It is preferred that this ratio should not exceed about 6:1 because above this ratio the edges of the laminations tend to behave as salient poles which would then result in some fluctuation of the magnetic flux passing through each individual iron lamination to an extent which would set up some eddy current and hysteresis loss.

Assuming that the shaft 10 is driven so that the armature 29 and the parts thereof 27 disposed between the pole faces 2 and 24 rotates an induced voltage will be set up between the inner and outer ends of the laminations 34 which are all in parallel with each other and subject to the completion of a circuit through these laminations a current will flow.

A closed circuit as indicated by the broken line 40 is in fact completed through the laminations 34 of the armature part 27 by means of outer conductor members 35 and 36 constituted by integral extensions of the copper laminations of the inner portion 16a of the central pole piece 16, through the laminations 34 of other armature part 28 and through the inner parts 28a and 27a of the armatures 31 and 29.

It is pointed out that the provision of the laminated inner portion 16a of the pole piece 16 avoids setting up a magnetic circuit of low reluctance, in the toroidal zone defined by the current path 40 (which would be the case were the inner portion 16a to be formed wholly of low carbon steel or other magnetically conductive material).

The fully laminated construction of the armature parts 26 and 27 and the stator part 16a ensures that the iron laminations are completely isolated from each other so far as the transmission of magnetic flux in the circumferential direction is concerned at all positions within the toroidal zone referred to, thereby avoiding the setting up of any magnetic circuit in this circumferential direction. If this were not the case then the armature parts and stator part concerned could become saturated magnetically by this short circuiting non-useful flux, and this would prejudice the proper torque-speed characteristics of the device as a whole because the main working fluxes 22 and 23 would, for given excitation currents, also be a function of the extent to which magnetic saturation is produced by the short circuiting flux. Since the latter depends upon the toroidal current (which varies according to the loading of the device) the operating characteristics would vary over the working range of torque values. Furthermore, for high values of torque, and hence toroidal current, the current changes required in the windings 20, 21 to produce given flux changes would be high, thus imposing more difficult requirements on the control system hereinafter described.

Components of the electrical circuit which are relatively movable to each other namely, the armature part 27 and the outer conductor 35; the armature part 28 and the outer conductor member 36; and the inner parts 27a and 28a of the input and output armatures 29 and 31; are connected electrically together through the intermediary of an electrically conductive liquid which in combination with portions of these members in contact with such liquid constitutes an electrical liquid brush device hereinafter more fully described and forming the subject of my co-pending application Serial No. 822,483 filed on the same date as the present application and entitled "Improvements Relating to The Transmission of Electric Current Between Relatively Movable Conductor Members."

The magnitude of the induced voltage between the inner ends of the laminations 34 incorporated in the armature part 27 and the outer ends of these laminations is dependent upon the speed of rotation of the part 28 in its gap and the magnitude of the magnetic flux passing between the pole faces 26 and 25. The torque exerted on the armature part 28 is dependent upon the magnitude of the current flowing in the closed circuit 40 and upon the magnitude of the magnetic flux passing between the pole face 26 and 25.

It will be evident, therefore, that by varying the magnitude of the magnetic flux passing between the pole faces 2 and 23 and the magnitude of the magnetic flux passing between the pole faces 26 and 25 relatively to each other the speed at which the armature part 28 is caused to rotate and the torque exerted thereon can be varied by any given value of speed of movement of the armature part 27 in its own gap.

One manner in which this relative variation in the magnitude of the two magnetic fluxes, as represented by the lines 22 and 23, can be attained is to vary the values of the current passing through the exciting windings 20 and 21 relatively to each other. The excitation current may be derived from a separate D.C. generator driven directly or indirectly from or with the input shaft 10 or from source such as an accumulator. Means such as a variable resistor may be provided in the supply circuit between this generator and one or both of the windings 20 and 21 to enable the value of the current passing through one of these windings to be varied relatively to the other.

Means may also be provided in the supply circuit for varying the direction of current at one winding 20 relatively to the other winding 21, so that if desired the direction of magnetic flux, as represented by the lines 22 and 23 may be reversed in one of these magnetic circuits as compared with the other.

The liquid utilised in the electrical liquid brush may be mercury and is indicated at 37, 38 and 39 for the three electrical liquid brush devices.

Figure 3:
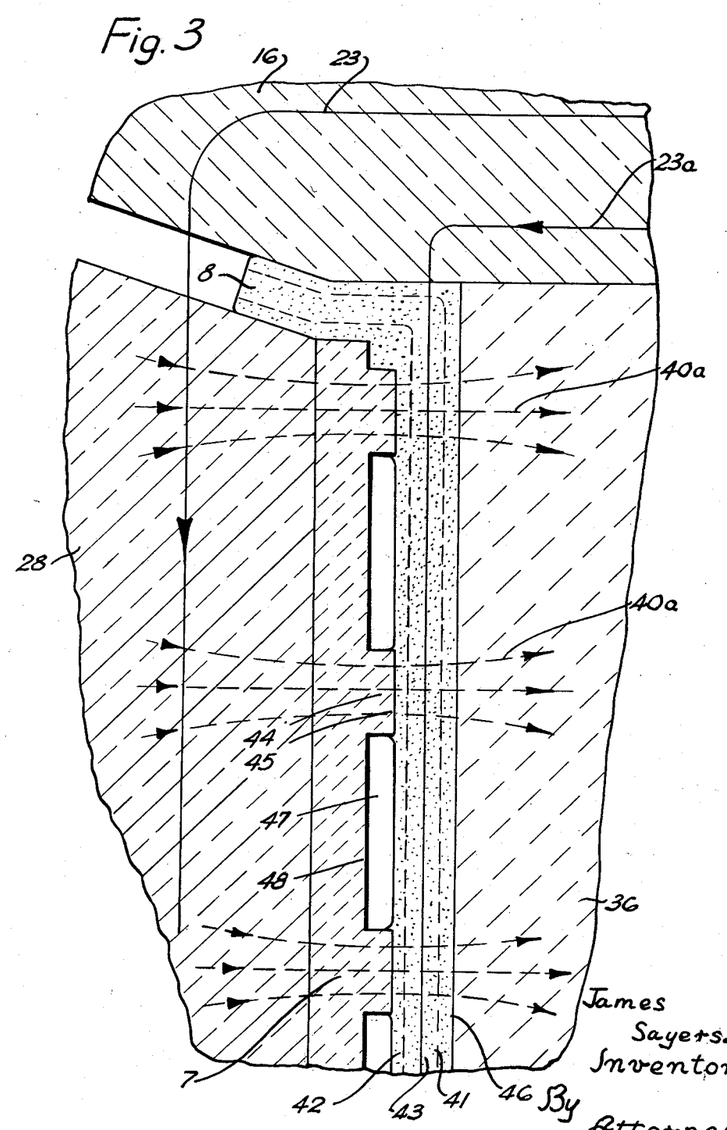
FIGURE 3 is a fragmentary view on an enlarged scale in plan and in diametral cross section through a portion of one of the electrical liquid brush devices incorporated in the transmission device.

Referring now specifically to FIGURE 3 which illustrates on a larger scale a portion of the electrical liquid brush device by means of which current is conveyed from the armature part 28 to the outer conductor member 36, it will be apparent that the outer conductor member 36 is normally stationary so that the lamina of mercury 41 immediately adjacent thereto in the gap between the opposed circumferential faces of the member 36 and the armature part 28 will also tend to be stationary whilst the lamina 42 of mercury immediately adjacent to the current communicating face of the armature part 28 will tend to rotate at the same speed.

For the sake of clarity in the drawing the thickness of these laminae has been deliberately exaggerated.

In between the two laminae 41 and 42 are a series of intermediate laminae 43 which move circumferentially at speeds between zero and the circumferential speed of the lamina 42, ideally such flow being laminar flow, that is to say taking place in cylindrical planes concentric with the axis of rotation.

In practice, this condition is dependent upon the circumferential speed of the current communicating face of the armature part 28 being maintained below a limiting value (for a given thickness of gap measured radially between the current communicating faces of the armature part 28 and the outer conductor member 36) and if such limiting speed is exceeded, flow of mercury in the intermediate laminae 43 becomes turbulent, that is to say, it takes place inter alia in directions radial or transverse to the ideal cylindrical planes of flow in a complex manner. This reduces the effective radial thickness in which laminar flow is maintained and since drag increases with any reduction in this dimension the drag is thus consequently increased. Whilst the flow is wholly laminar the drag is proportional to the relative circumferential velocity between the current communicating faces, but once turbulent flow is set up in the intermediate laminae 43 the drag then increases as the square of the relative velocity.

Any one or each of three expedients are adopted to reduce frictional drag, these being firstly to reduce area of the relatively moving current communicating faces connected by the liquid, secondly to suppress turbulent flow in the intermediate laminae, and thirdly to subdivide the gap radially whereby the relative circumferential velocity which gives rise to the drag is reduced.

The first of these expedients is the formation on one of the current communicating faces at least, preferably the face afforded by a continuous annular member 7 connected electrically to the laminations 34 of the armature part 28 of a plurality of ribs 44, the outer circumferential faces 45 of which then collectively constitute the current communicating faces of the armature part 28.

Typically when mercury is used as the electrically conductive liquid the radial dimension of the gap between the faces 45 and 46 may be approximately 0.005 of an inch for a circumferential speed of the faces 45 to 140 ft. per second or thereabouts.

The spaces between the ribs 44 which may be in the form of grooves 47 do not tend to become filled with the electrically conductive liquid because this is subjected to centrifugal forces tending to maintain it in circumferential flow of maximum path diameter (in fact determined by the diameter of the current communicating face 46). It is, in fact, not difficult to so adjust the pressure conditions obtaining in those parts of the liquid opposite the grooves 47 to ensure that the liquid does not penetrate into the grooves or does so only to a slight extent, as illustrated in FIGURE 3.

This may be contrived by providing a reservoir portion 8 of liquid in the gap between the axial boundary of the armature part 28 and the opposed pole faces such as the pole face 26. Liquid in this reservoir portion will tend to be expelled radially and will thus exert a "hydrostatic" pressure at the ends of the cylindrical shell of liquid occupying the gap between the current communicating faces of the conductor member 7 and the conductor member 36, so that by controlling the quantity of liquid present in the reservoir portion 8 the magnitude of the "hydrostatic" pressure can be controlled and this can be made to set up balance with the centrifugal forces acting on the liquid opposite the grooves 47 so as to prevent any extensive penetration of the liquid into these grooves.

Because there is no contact between the liquid which is disposed opposite to the grooves 47 and the bases or inner circumferential faces 48 of these grooves themselves, liquid contained in the lamina 42 opposite to the grooves 47 is not constrained by contact with the conductor member 7 and does not therefore exert significant drag thereon, so that the drag is reduced by a factor approximating to the ratio of the area afforded by the faces 45 to the total area afforded by the faces 45 and 48 together.

Also, because the radial thickness of liquid opposite to the grooves 47 is equal to or only slightly greater than the thickness of liquid between the faces 45 and 46, and because the liquid in the lamina 42 opposite the grooves 47 is not constrained to move at the same circumferential speed as the faces 45, turbulent flow is also avoided or the risk of it being set up is reduced in those portions of the intermediate laminae 43 opposite the grooves.

The lateral concentration or crowding together of the current in the conductor members 7 and 36 (typically) which results from the reduction in the effective width of the current communicating face of the member 7 would tend to reduce the efficiency by increasing the electrical resistance of the current path, were this lateral concentration or crowding confined to a single rib (or produced merely by a reduction in the widths of the current communicating faces of the conductor members).

By utilising a plurality of ribs spaced about laterally, the increase in electrical resistance is much less pronounced and may be negligible because of lateral spreading out of the current as indicated by the broken line arrows 40a from the bases of the ribs (and from the annular areas of the other conductor member opposed thereto) so that within a very small radial distance the lateral current distribution in each of these members becomes nearly uniform. The loss of efficiency through such slight increase in electrical resistance as occurs is significantly exceeded by the gain in efficiency due to reduction in frictional drag.

For optimum efficiency it is believed that the sum of the axial widths of the ribs should be about one half to one tenth of the total width of the conductor member on which they are present, a preferred value being about one fifth. The height of each rib may typically be about one third of its axial width. The ribs may be spaced apart laterally uniformly across the width of the conductor member, the extreme lateral ribs being somewhat inset from the lateral boundaries.

If desired, the current communicating faces 45 and 46 could themselves be shaped to include local formations of small depth which would promote axial flow of the liquid, for example, in opposite directions in the laminae 41 and 42 respectively so that an axially extending circular is set up whereby there is a migration of liquid from positions at which the current carrying duty is at or near a maximum to positions at which the current carrying duty is at or near a minimum.

Referring now to the second expedient, this comprises the setting up of a magnetic field extending in a direction parallel to the plane in which laminar flow is required to be maintained i.e. parallel to the planes of the opposed current communicating faces 45 and 46 and traversing the gap between these faces in a direction perpendicular to the relative movement between them. This field may be set up by the same pole pieces as are utilised to set up the magnetic field in which the armature parts operate, a portion of the magnetic flux as indicated diagrammatically by the arrow 23a "leaking" through the electrically conductive liquid.

It will be observed that in fact the direction of the leakage flux 23a is perpendicular to both the direction of current flow through the liquid and to the direction of relative movement between the face 45 of the conductor member and the face 46 of the outer conductor member 36.

In practice, the leakage flux 23a would probably not lie in a strictly cylindrical plane as theoretically desired and thus the general configuration of the generatrixes which define the current communicating faces of the conductor members (in this case 7 and 36) could be shaped so as to be parallel or nearly parallel with the actual leakage flux path in the gap.

The existence of any appreciable fringing or leakage flux extending radially and axially inwards from the stator portion 16 to the armature parts 27, 28 and from the stator portions 17 and 18 to these armature parts across the corners of the armature parts where their circumferential and axial faces meet, is avoided by making the conductor member 7 of a substantial thickness, e.g. $\frac{1}{16}$ to $\frac{1}{8}$ of an inch. This imposes a high reluctance barrier in the path of any such fringing or leakage flux tending to cross the gap between the current communicating faces of the conductor members bordering thereon. If such fringe or leakage flux existed in this direction it would tend to set up electrical eddy currents in the mercury and in the conductor members such as 7 themselves with resulting loss and heat generation.

Axial displacement of the liquid in the gap between the current communicating faces bodily from one lateral boundary of the gap towards the other in consequence of forces set up electro-magnetically in the liquid itself may be counteracted by providing a somewhat greater quantity of liquid in one of the reservoir portions at one lateral boundary than is the case at the other, so that there is a resultant hydrostatic pressure exerted axially in the gap. Retention of the liquid in the gap is also assisted by capillary forces set up between the current communicating faces 45 and 46. The capillary forces are exerted on the liquid at the axial boundaries of each and thus the total retention force set up is proportional to the number of ribs.

A mercury equalising duct 99 may be drilled through the pole piece 16 at a position inset radially by a short distance, typically $\frac{1}{8}$ of an inch, from the inner current communicating face 45, so that it is not possible for all the mercury to accumulate in one or the other of the two brush devices connected by such duct.

Should any tendency to develop turbulent flow occur in the intermediate laminae 43 such turbulent flow will necessarily involve movement of liquid in a direction intersecting with the leakage flux 23a and consequently induced currents would be set up in the liquid producing electro-magnetic forces in the liquid opposing the movement initiating the induced currents.

In the case of the liquid brush device operative between the inner parts 27a and 28a of the input and output armatures 29 and 31 respectively, the third expedient for reducing frictional drag is employed.

This expedient consists in providing a shell 79 of ring-like form between the current communicating faces 80 and 81 of the inner parts of the output and input armatures respectively.

The shell 79 is of circular form in cross section perpendicular to the axis of rotation of the armatures and has inner and outer circumferential faces which in longitudinal cross section are parallel to the opposed current communicating faces 80 and 81 being, in the particular example illustrated, of cylindrical form.

The shell 79 which may be made of copper and protected against any attack by the mercury by provision of a barrier layer for example of nickel, the exposed surface of which is provided with a wetting layer or otherwise treated to promote wetting of the shell. The latter is freely rotatable in the gap between the two current communicating faces and will, during operation of the device, rotate at an angular velocity intermediate the angular velocities of the input and output armatures. In practice the shell 79 will normally rotate relatively to the outer current communicating face 81 at a peripheral speed which is half that of the current communicating face 81 relatively to the current communicating face 80.

The viscous or frictional drag exerted on the input armature 29 is thus reduced (by a factor of 4 for a Reynolds number greater than that at which laminar flow is maintained).

It will be evident that if desired the gap between the current communicating faces could be sub-divided radially by the provision of a series of shells such as 79 disposed one within the other, in which case the viscous or frictional drag would be still further reduced (under the conditions mentioned by a factor approximately equal to the square of the number of subordinate gaps produced by the radial sub-division).

Preferably, and as illustrated, the radial distance between the inner face of the shell 79 and the current communicating face 80 is made less than the radial distance between the outer face of the shell and the current communicating face 81. This prevents the shell ever coming into contact with both armatures simultaneously.

If a series of shells were provided one within the other, these would preferably be made of very small radial thickness for example about 0.01 inch and provision would be made to maintain total immersion of the shells at all times so as to avoid rubbing contact between the shells being set up in the initial stages of relative movement between the conductor members of the brushes in which the shells are incorporated.

At the ends of the gap within which the shell 79 is situated stop members are provided to prevent displacement of the shell in its own plane i.e. axially. One of these stop members 85 also forms a seal for the mercury. The other one 85a has a clearance with respect to the inner of the two armature faces. Both stop members are preferably made of a material which has a low coefficient friction with respect to that of the shell 79.

In some cases where the shell is subjected to an axial thrust in one direction (e.g. because of the presence of a magnetic field) only one of the stop members need be provided or if two are provided only one of these need have a low coefficient of friction, such magnetic field may be set up by the toroidal current 40.

It will be appreciated that since the gap within which the shell 79 is disposed is inset radially by an appreciable distance from the main working magnetic fluxes 22, 23 and is separated from the laminated armature parts by the armature parts which are composed wholly of copper, there will be no risk of any flux of appreciable magnitude traversing the gap between the opposed current communicating faces so that the risk of generating electrical eddy currents in the mercury or the shell 79 is substantially eliminated.

It will, of course, be understood that if desired the first expedient previously referred to, namely the provision of ribs on one of the current communicating faces may be adopted in this brush device, as may also the second expedient of providing a magnetic flux traversing the gap in the direction of its width.

Mercury is retained in the several liquid electrical brush devices illustrated by means of sealing rings 83 to 86.

The space 100 communicates through a vent duct 101 with the gap between the armature 31 and the pole face 25 so as to prevent pressure variations in the space 100 producing unwanted displacement of the mercury in the two outer brush devices. If desired a similar vent duct could be provided between the space 100 and the gap between the pole face 2 and the armature 27.

Whilst it is contemplated that mercury or an alloy of mercury with a small quantity of copper or tin will, in general, be the most suitable to employ in the transmission device now described, it will be understood that any or all of the expedients referred to and described specifically herein can be utilised for other electrically conductive liquid such as that previously mentioned.

The foregoing description in detail is applicable to the electrical liquid brush device operative between both armature parts and outer conductive members 35 and 36 respectively.

In the case of this brush device the circumferential speed of the current communicating face afforded by the ribs will be somewhat less than that obtaining in the case of the brush devices operative between the armature parts 27 and 28 and their respective outer conductor members 35 and 36 and for this reason it may not be necessary to utilise the second expedient namely, the setting up of a magnetic field such as that represented by the leakage flux 23a in FIGURE 3. If, however, such a field were desired, it could be set up by extending pole pieces to positions adjacent to the lateral boundaries of the gap between the inner part of the output armature 31 and the input armature 29 and providing a suitable excitation for such pole pieces, the output armature 31 incorporating an axially extending groove or recess or being otherwise shaped to permit of the pole piece adjacent thereto projecting sufficiently closely to the lateral boundary of the gap concerned.

Figure 4:
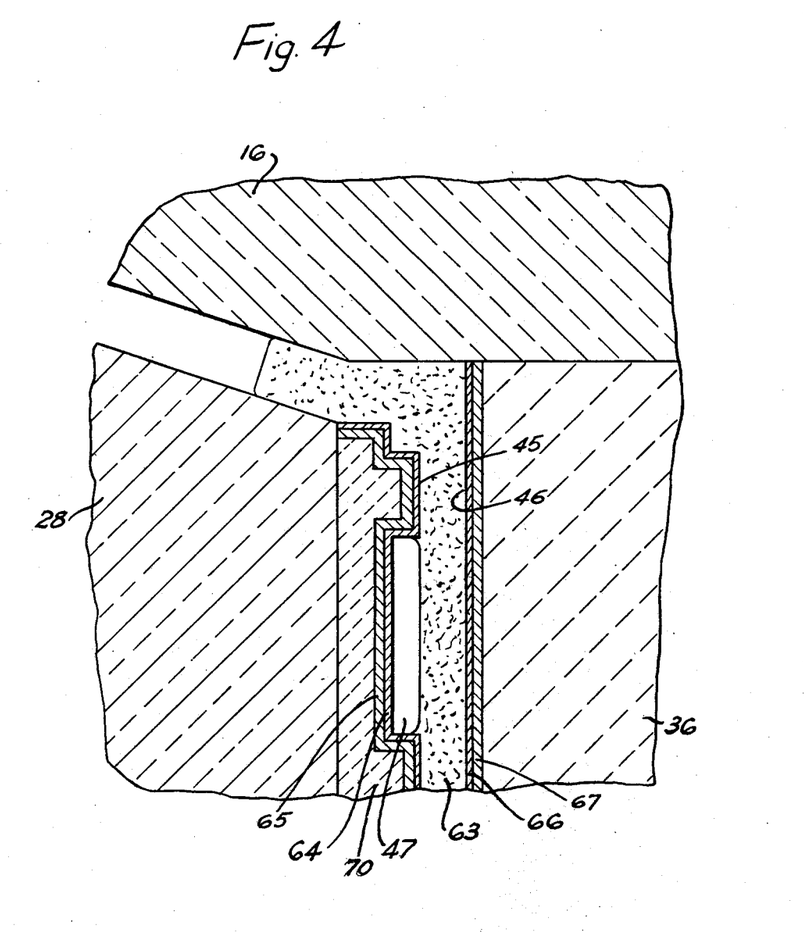
FIGURE 4 is a fragmentary view similar to FIGURE 3 on a still further enlarged scale showing the structure of the conductor members adjacent to their current communicating faces.

The face presented radially outwards of the armature part which is exposed to contact with the mercury 63 is constituted by an outermost layer 64 of copper beneath which is a barrier layer 65 of nickel. Two similar layers 66 and 67 respectively are incorporated at the inwardly presented face of the conductor member 36.

The thickness of both layers as seen in FIGURE 4 has been deliberately exaggerated for the sake of clarity.

Both layers may be deposited on the conductor member to which they pertain by a plating process and the wetting layer 64 subsequently becomes reduced in thickness by amalgamation with the mercury 63 so that finally it is only of just sufficient thickness to enable contact to be made between the mercury and the conductor member over a surface which is wetted. A very thin wetting layer 64 of copper will serve this purpose and such layer may be of molecular thickness.

The same considerations apply to the wetting and barrier layers 66 and 67 of the conductor member 36.

It will be observed that the wetting and barrier layers are in the case of the armature part 28 continued over the axially presented faces and the base of each slot 47 intervening between adjacent ribs 44 of the armature part so that should the mercury 63 temporarily be brought into contact with these faces or the base of the slot, as for example when the armature part 28 is stationary, there will be no physical contact between the copper incorporated in the armature part 28 (except the wetting layer 64) and the mercury 63.

The thickness of the barrier layers 65 and 67 of nickel may typically be 0.001 inch. This is not critical but if the barrier layer of nickel has some slight porosity its thickness should be sufficient to prevent effective contact between the mercury and the underlying copper of the armature part or conductor member concerned.

It will of course be understood that other electrically conductive metals may be employed in substitution for nickel, to form the barrier layer, such metals being selected for their ability to withstand physical or chemical attack by the mercury. A metal which may be employed for the barrier layer as a substitute for nickel is iron.

Similarly other suitable metals may be employed in substitution for copper to form the wetting layer provided, such metals are wetted when brought into contact with mercury these metals also being electrically conductive.

Instead of using a wetting layer of copper or other metal as referred to, the exposed surface of the barirer layer may be treated with a flux or etching agent which promotes wetting of the surface by mercury or the alloy thereof previously referred to. One such flux which may be employed is zinc chloride.

An etching agent which may be used is nitric acid.

In cases where it is desired to maintain continuous immersion or covering of the current communicating faces (except the spaces between the ribs when the apparatus is operating), a mercury tank or receiver 102 may be provided at any suitable position, preferably externally of the stator. This tank or receiver 102 communicates by way of duct 103 with the mercury space between the opposed current communicating faces.

The inner brush device between the two armature parts would be fed with mercury through the duct 104.

The exposed edge faces of the laminations of the stator portions 16a and of the armature portions 26 and 27 are also plated with the barrier layer metal e.g. nickel. This protects the copper laminations.

Referring now to the mechanical arrangements of the device the transmission device may include end members 50 and 51 both of non-magnetic material to avoid any short circuiting or leakage of the desired magnetic flux passing between opposed pole faces 2 and 24, and 25 and 26. The member 50 may be a plate secured in any suitable manner, as by bolts 70, at its outer margin to the pole piece 17 and incorporates a housing 72 containing a ball bearing 73 for the shaft 10. The member 51 may include a similar disc-like portion similarly secured to the pole piece 18 by bolts 71 and in its central region incorporating a generally cylindrical bearing housing 52 containing bearings 53 and 54 which may be of the tapered roller bearing type, and by means of which the output shaft 11 is journalled rotatably in the housing 52. The latter may include a suitable end plate 5 secured by bolts to the housing 52 itself, and oil seals 74 and 75 may be provided in both cases.

At its inner end the input shaft 10 is integrally connected with or is otherwise fixed to a bevel gear 30 which constitutes one of the elements of the differential gear 12. A cage or carrier 32 located coaxially with the gear 30 by a ball bearing 76 and fast with respect to the output shaft 11 is provided with radially projecting stub shafts 55 carrying bevel gears 56 which mesh with the two opposed coaxial bevel gears 30 and 58 of the differential gear.

The bevel gear 30 is integral with or is otherwise fixed to the input shaft 10 and also is fixed to the inner part 27a of the input armature 29 by way of an integral radially inwardly projecting flange part 9 which is secured to the bevel gear 30 by bolts 60.

The bevel gear 58 is similarly secured to inner part 28a of the output armature 31 by way of a radially inwardly projecting part 61 secured to the bevel gear 58 by bolts 62, but is freely rotatable with respect to the output shaft 11 between which such gear is disposed a thrust bearing 78. Annular members 77, 77a of L-shape in cross section and of electrically insulating material are interposed resistively between the parts 59 and 27a, and the parts 61 and 28a to avoid setting up an electrical current path in parallel with the laminations 34 (as between their inner and outer radial boundaries) embodied in the armature parts 27 and 28. As a possible alternative or in addition such insulation could be provided between parts 17 and 50, and parts 18 and 51.

In operation of the transmission device the input torque applied to the shaft 10 is shared between the differential gear and the homopolar machine in the course of transmission to the output shafe 11 thereby reducing the maximum value of the circulating current 40.

It will be evident from the foregoing description that the transmission device as a whole involves only a very few working parts in comparison with transmission devices at present in use in motor cars and other land vehicles for effecting torque conversion as between the prime mover or motor driving wheels or tracks. Consequently it is contemplated that the transmission device in accordance with the invention will be capable of being manufactured at a cost which is low in comparison with existing devices performing similar duty and will also be of small weight and bulk.

Furthermore, the transmission device is itself simple and therefore inherently reliable and admits of a particularly simple form of users' control. For example, a single operating member may be provided to vary the value and direction of the direct currents passing through the exciting windings 20 and 21 relatively to each other, so that in the case of a motor car or other land vehicle the driver by the use of a single control member can cause the vehicle to move in either direction with effective stepless change in the gear ratio as between the engine or motor and the driving wheels throughout the whole range of which the transmission device is inherently capable.

The output shaft 11 will be stationary when the output armature part 31 is caused or permitted to rotate in a direction opposite to the input armature part 29 at a speed equal to the speed of rotation thereof. This condition is achieved when the magnetic fluxes 22 and 23 are of equal magnitude and traverse the armatures in opposite directions as seen in FIG. 1. Any departure from these flux conditions will result in the transmission of torque to the output shaft 11 in one direction or the other. Thus if the flux 23 is reduced relatively to the flux 22 but the two fluxes still traverse their respective armatures in opposite directions the output shaft will be caused to rotate in the opposite direction as the input shaft. If on the other hand the flux 22 is reduced the output shaft 11 will rotate in the same direction as the input shaft 10, rotating progressively faster as the flux 22 is reduced to zero, reversed, and then increased in magnitude (while traversing the input armatures 29 in the same direction as that in which the flux 23 traverses the output armature 31).

What I claim then is:

1. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machines through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, whereby the relatively high reluctance laminations isolate the relatively low reluctance laminations magnetically from each other in the circumferential direction of said toroidal zone, and prevent the establishment of a continuous closed circumferentially extending magnetic circuit therein, at least one of said sets of laminations being formed of a material having a low electrical resistance, to enable current to be conveyed in said electrical circuit without excessive resistive loss.

2. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machines through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, and united thereto by fusion to form units which are heterogeneous in the direction of the circumference of said toroidal zone and thus to prevent the establishment of a continuous closed circumferentially extending magnetic circuit therein, at least one of said sets of laminations being formed of a material having a low electrical resistance, to enable current to be conveyed in said electrical circuit without excessive resistive loss.

3. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machine through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zones, the laminations of one of said sets being disposed in interleaved relation with the laminations of the other of said sets, whereby the relatively high reluctance laminations isolate the relatively low reluctance laminations magnetically from each other in the circumferential directions of said toroidal zone, and prevent the establishment of a continuous closed circumferentially extending magnetic circuit therein, said laminations of both sets being of a thickness in relation to the thickness of each gap included in said magnetic circuits and lying within said toroidal zone, such as to avoid substantial high frequency magnetic flux variations in each lamination of said low reluctance set, at least one of said sets of laminations being of low electrical resistance.

4. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machines through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, whereby the relatively high reluctance laminations isolate the relatively low reluctance laminations magnetically from each other in the circumferential direction of said toroidal zone, and prevent the establishment of a continuous closed circumferentially extending magnetic circuit therein, said laminations of both sets having a thickness less than six times the thickness of each gap included in said magnetic circuits and lying within said toroidal zone, at least one of said sets of laminations being of low electrical resistance.

5. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machines through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, and united thereto by fusion to form units which are heterogeneous in the direction of the circumference of said toroidal zone and thus to prevent the establishment of a continuous closed circumferentially extending magnetic circuit therein, said laminations of both sets being of a thickness in relation to the thickness of each gap included in said magnetic circuits and lying within said toroidal zone such as to avoid substantial high frequency magnetic flux variation in each lamination of said low reluctance set, at least one of said sets of laminations being of low electrical resistance.

6. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machine through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, whereby the relatively high reluctance laminations isolate the relatively low reluctance laminations magnetically from each other in the circumferential direction of said toroidal zone, and prevent the establishment of a continuous closed circumferentially extending magnetic circuit therein, at least one of said sets of laminations being formed of a material having a low electrical resistance, to enable current to be conveyed in said electrical circuit without excessive resistive loss, said rotors having current entry and exit faces disposed in opposed spaced relation to current exit and entry faces in said stators and electrically connected therewith through said brush means disposed in gaps between each pair of said opposed faces, said rotors further having pole faces for entry and exit of said main working fluxes spaced from said current entry and exit faces on said rotors to avoid crossing of said gaps by said main working fluxes, said pole faces lying in planes transverse to said current communicating faces.

7. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotable portions of the machines through which said electrical circuit extends, said stator structure and said rotors including portions lying within a toroidal zone bounded by said electrical circuit and also conveying said main working fluxes, said portions being formed wholly of sets of laminations of relatively high magnetic reluctance and of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the laminations of the other of said sets, whereby the relatively high reluctance laminations isolate the relatively low reluctance laminations magnetically from each other in the circumferential direction of said toroidal zone, and prevent the establishment of a continuous closed circumferentially extending magnetic circuit therein, at least one of said sets of laminations being formed of a material having a low electrical resistance, to enable current to be conveyed in said electrical circuit without excessive resistive loss, said rotors having current entry and exit faces disposed in opposed spaced relation to current exit and entry faces in said stators and electrically connected therewith through said brush means disposed in gaps between each pair of said opposed faces all of these faces being surfaces of revolution having generatrixes extending generally parallel to the rotor axes, said rotors further having pole faces for entry and exit of said main working fluxes lying in planes which are transverse to said rotor axes and spaced from said current entry and exit faces in said rotors to avoid crossing of said gaps by said main working fluxes.

8. A transmission device comprising two homopolar machines having a common stator structure including respective stators for each of said machines, and rotors mounted for rotation relatively to each other and forming parts of respective magnetic circuits extending through said stators and conveying respective main working magnetic fluxes, exciting means for varying at least one of said magnetic fluxes, and an electrical circuit, interlinked with said respective magnetic circuits, said electrical circuit extending through said rotors and including brush means operative between successive relatively rotatable portions of the machines through which said electrical circuit extends, said stator structure and said rotors including portions lying within a toroidal zone bounded by said electrical circuit and also conveying said main working fluxes said portions being formed wholly of sets of laminations of copper and of a ferrous material of relatively low magnetic reluctance respectively, said laminations lying in planes intersecting said toroidal zone and disposed generally parallel to paths along which electric current and magnetic flux extend in said toroidal zone, the laminations of one of said sets being disposed in interleaved relation with the lamination of the other of said sets, whereby the copper laminations isolate the ferrous material laminations from each other in the circumferential direction of said toroidal zone, to prevent the establishment of a continuous closed circumferentially extending magnetic circuit therein.

References Cited in the file of this patent
UNITED STATES PATENTS

| | | |
|---|---|---|
| 1,184,224 | Breslauer | May 3, 1916 |
| 1,635,319 | Gill | July 12, 1927 |
| 2,682,618 | Jaeschke | June 29, 1954 |
| 2,769,931 | Allen | Nov. 6, 1956 |
| 2,979,630 | Bishop | Apr. 11, 1961 |